US011964842B2

(12) United States Patent
Tsunoi et al.

(10) Patent No.: US 11,964,842 B2
(45) Date of Patent: Apr. 23, 2024

(54) PINCH ROLLER MECHANISM AND PLOTTER

(71) Applicant: Silhouette Japan Corporation, Kanagawa (JP)

(72) Inventors: Yoshitaka Tsunoi, Kanagawa (JP); Maki Nagasawa, Kanagawa (JP)

(73) Assignee: SILHOUETTE JAPAN CORPORATION, Kanagawa (JP)

( * ) Notice: Subject to any disclaimer, the term of this patent is extended or adjusted under 35 U.S.C. 154(b) by 178 days.

(21) Appl. No.: 17/325,265

(22) Filed: May 20, 2021

(65) Prior Publication Data

US 2021/0380360 A1 Dec. 9, 2021

(30) Foreign Application Priority Data

Jun. 9, 2020 (JP) ................................ 2020-099914

(51) Int. Cl.
*B65H 5/06* (2006.01)
*B41J 13/02* (2006.01)
*B65H 27/00* (2006.01)

(52) U.S. Cl.
CPC ............ *B65H 5/062* (2013.01); *B41J 13/025* (2013.01); *B65H 27/00* (2013.01); *B65H 2301/44318* (2013.01); *B65H 2402/31* (2013.01); *B65H 2402/32* (2013.01); *B65H 2402/54* (2013.01); *B65H 2402/60* (2013.01); *B65H 2404/14* (2013.01); *B65H 2404/1424* (2013.01); *B65H 2404/144* (2013.01); *B65H 2801/36* (2013.01)

(58) Field of Classification Search
CPC .... B65H 5/062; B65H 27/00; B65H 2404/14; B65H 2404/1523; B65H 2801/36
See application file for complete search history.

(56) References Cited

U.S. PATENT DOCUMENTS 3,964,739 A 6/1976 Garcia
4,512,564 A 4/1985 Alverth et al.
(Continued)

FOREIGN PATENT DOCUMENTS

JP 2009084047 A 4/2009
JP 2017186109 A 10/2017

OTHER PUBLICATIONS

Extended European Search Report issued by the European Patent Office in relation to European Application No. 21174410.7 dated Nov. 10, 2021 (7 pages).

(Continued)

*Primary Examiner* — Jeremy R Severson
(74) *Attorney, Agent, or Firm* — Robert P. Michal, Esq.; Carter, DeLuca & Farrell LLP

(57) ABSTRACT

A pinch roller mechanism includes a rail, a slider, a roller bracket, a spring, and a pinch roller. The rail extends in a first direction crossing the conveyance direction of a medium while being apart from a medium driving roller configured to convey the medium. The slider is supported by the rail to be movable along the rail. The roller bracket is supported by the slider to be movable with respect to the medium driving roller. The spring is provided between the slider and the roller bracket and biases the roller bracket toward the medium driving roller. The pinch roller is rotatably supported by the roller bracket while setting the axial direction in the first direction.

13 Claims, 10 Drawing Sheets

(56) References Cited

U.S. PATENT DOCUMENTS 5,163,675 A 11/1992 Sunohara
5,289,206 A * 2/1994 Ishikawa ................ B65H 5/062
400/636

OTHER PUBLICATIONS

Japanese Office Action dated Feb. 13, 2024, issued in corresponding Japanese Appln. No. 2020099914, (4 pages) and English translation (4 pages), total 8 pages.

* cited by examiner

PINCH ROLLER MECHANISM AND PLOTTER

BACKGROUND OF THE INVENTION

The present invention relates to a pinch roller mechanism that biases a pinch roller toward a medium, and a plotter including the pinch roller mechanism.

As disclosed in, for example, Japanese Patent Laid-Open No. 2017-186109 (literature 1), a cutting plotter includes a plurality of pinch rollers to press a medium to be cut against a medium driving roller. Each pinch roller disclosed in literature 1 is formed into a cylindrical shape and attached to a rotating shaft extending through the hollow portion of the pinch roller such that the position in the axial direction can be changed. The rotating shaft is rotatably supported by the frame of the cutting plotter in a state in which its axis extends in the horizontal direction (the horizontal direction will be referred to as a left-and-right direction hereinafter) crossing the conveyance direction of the medium and rotates integrally with the pinch rollers.

A general cutting plotter includes a pinch roller mechanism that applies a pressing force to a pinch roller while permitting rotation of the pinch roller. The pinch roller mechanism employs a configuration for rotatably supporting both end portions of the rotating shaft and pressing it against a medium driving roller. According to this pinch roller mechanism, the pressing force for pressing the pinch roller against a medium is transmitted to the pinch roller via the rotating shaft.

When the above-described pinch roller mechanism is used in a cutting plotter that is wide in the left-and-right direction, the plurality of pinch rollers may not be arranged evenly in the left-and-right direction. For example, if a plurality of pinch rollers are arranged unevenly on the left side, a relatively large pressing force is applied to pinch rollers located on the right side of the rotating shaft. Then, the pinch rollers located on the right side of the rotating shaft press a medium to be cut more strongly than the pinch rollers on the other side, and it is difficult to correctly press the medium.

Hence, when the above-described pinch roller mechanism is used in a cutting plotter that is wide in the left-and-right direction, a medium cannot correctly be pressed because the pressing force is not evenly applied to a plurality of pinch rollers. Such a problem occurs not only in a cutting plotter but also similarly in a pen plotter that draws a character or a pattern on a sheet-shaped medium.

SUMMARY OF THE INVENTION

It is an object of the present invention to allow a pinch roller to press a medium by a predetermined pressing force regardless of the position of the pinch roller in the left-and-right direction.

In order to achieve the above object of the present invention, there is provided a pinch roller mechanism of a plotter, comprising a rail supported by a frame of the plotter and extending in a first direction crossing a conveyance direction of a medium while being apart from a medium driving roller configured to convey the medium, a slider supported by the rail to be movable along the rail, a roller bracket supported by the slider to be movable forward and backward with respect to the medium driving roller, a spring provided between the slider and the roller bracket and configured to bias the roller bracket toward the medium driving roller, and a pinch roller rotatably supported by the roller bracket while setting an axial direction in the first direction.

According to the present invention, there is also provided a plotter comprising a medium driving roller configured to convey a medium, a work stage arranged on an upstream side of a conveyance direction of the medium with respect to the medium driving roller, a frame standing on both sides of the work stage, a pinch roller mechanism configured to bias a pinch roller toward the medium, and a pen carriage configured to support a pen that performs processing for the medium, wherein the pinch roller mechanism comprises the above-described pinch roller mechanism.

DESCRIPTION OF THE PREFERRED EMBODIMENTS

First Embodiment

The first embodiment of the present invention will now be described in detail with reference to FIGS. 1 to 9.

Figure 1:
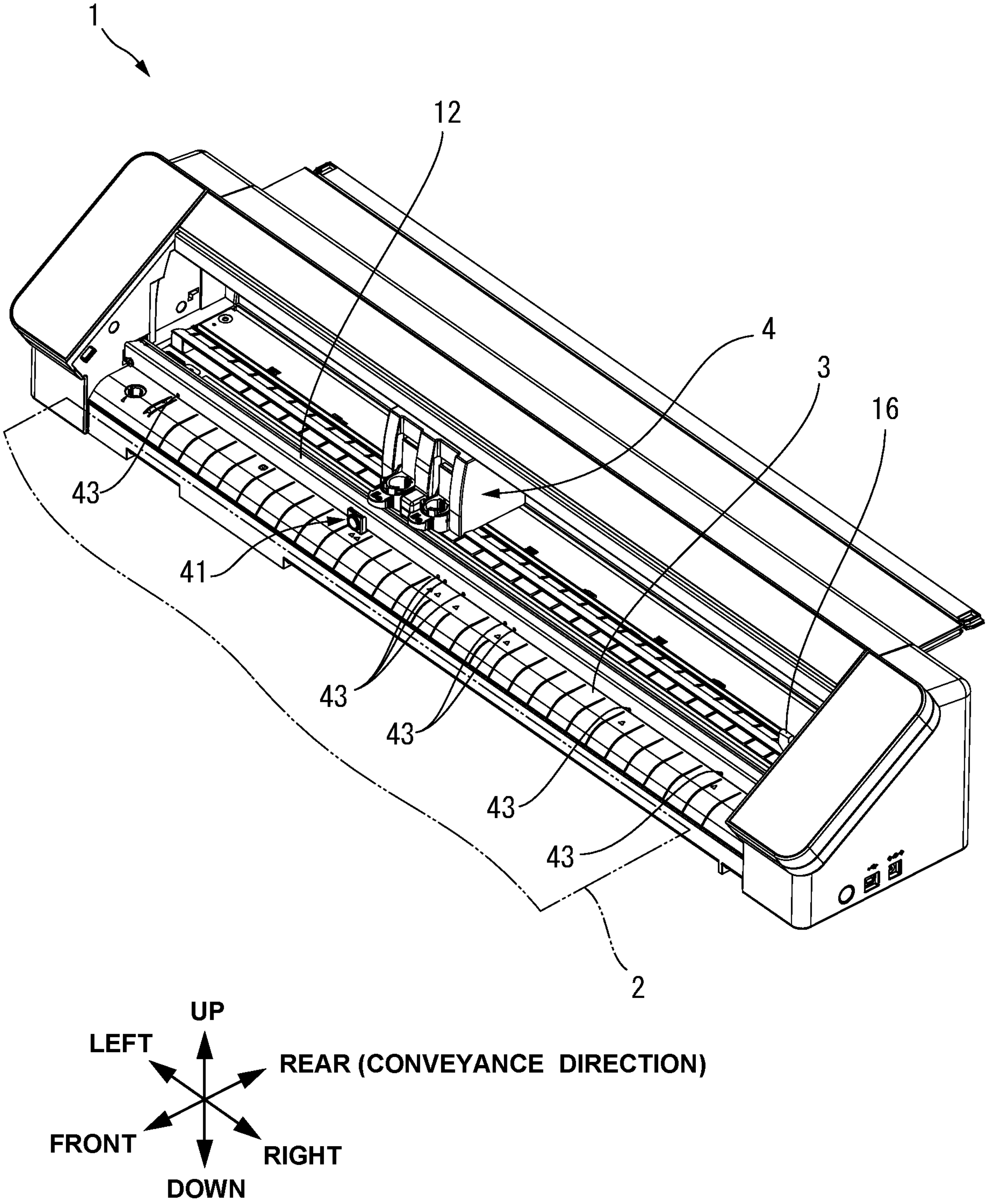
FIG. 1 is a perspective view of a cutting plotter including a pinch roller mechanism according to the first embodiment of the present invention.

A cutting plotter 1 shown in FIG. 1 cuts out a graphic pattern or a character from a sheet-shaped medium 2. The cutting plotter 1 includes a work stage 3 to which the medium 2 is conveyed, and a pen carriage 4 that supports a cutting pen. Examples of the medium 2 are a cut sheet or a sheet wound in a roll shape.

(Work Stage and Pen Carriage)

The work stage 3 extends in the conveyance direction of the medium 2 (in FIG. 1, the direction from the lower left side to the upper right side) and in the left-and-right direction (first direction: in FIG. 1, the direction from the upper left side to the lower right side) that is the horizontal direction crossing the conveyance direction. The downstream side of the conveyance direction of the medium 2 will be referred to as a rear side, and the upstream side of the conveyance direction of the medium 2 will be referred to as a front side hereinafter. A frame 13 (see FIG. 4) stands on both sides of the work stage 3 in the left-and-right direction.

Figure 2:
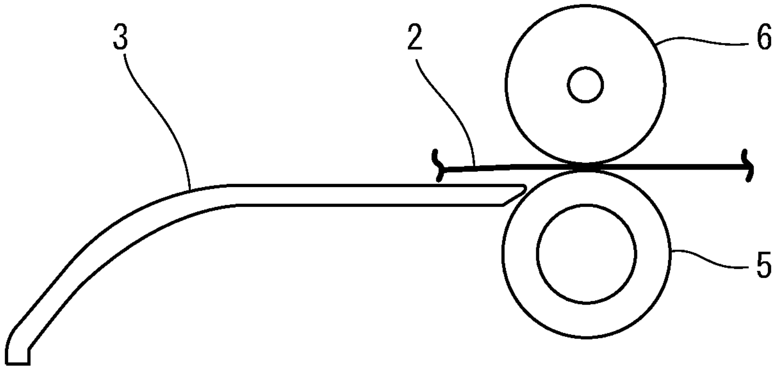
FIG. 2 is a side view showing a state in which a medium is sandwiched between a driving roller and a pinch roller.

As shown in FIG. 2, a medium driving roller 5 that conveys the medium 2 is provided on the rear side of the work stage 3. The medium driving roller 5 extends in the left-and-right direction. Both end portions of the medium driving roller 5 are rotatably supported by the frame 13. A number (a plurality of) small projections 5*a* (see FIG. 12) are formed in a predetermined range of the peripheral surface of the medium driving roller 5. When the medium driving roller 5 is rotated in a state in which the medium 2 is sandwiched between the medium driving roller 5 and a pinch roller 6, the medium 2 is conveyed.

The pen carriage 4 has a function of driving the cutting pen in the up-and-down direction and is configured to be movable in the left-and-right direction. Here, the up-and-down direction is the vertical direction crossing the work stage 3.

When the cutting pen is attached to the pen carriage 4, the medium driving roller 5 is rotated forward or backward in a state in which the medium 2 is sandwiched between the medium driving roller 5 and the pinch roller 6, and the cutting pen is stuck into the medium 2 and moved in the left-and-right direction together with the pen carriage 4, the medium 2 is cut.

(Outline of Pinch Roller)

Figure 3:
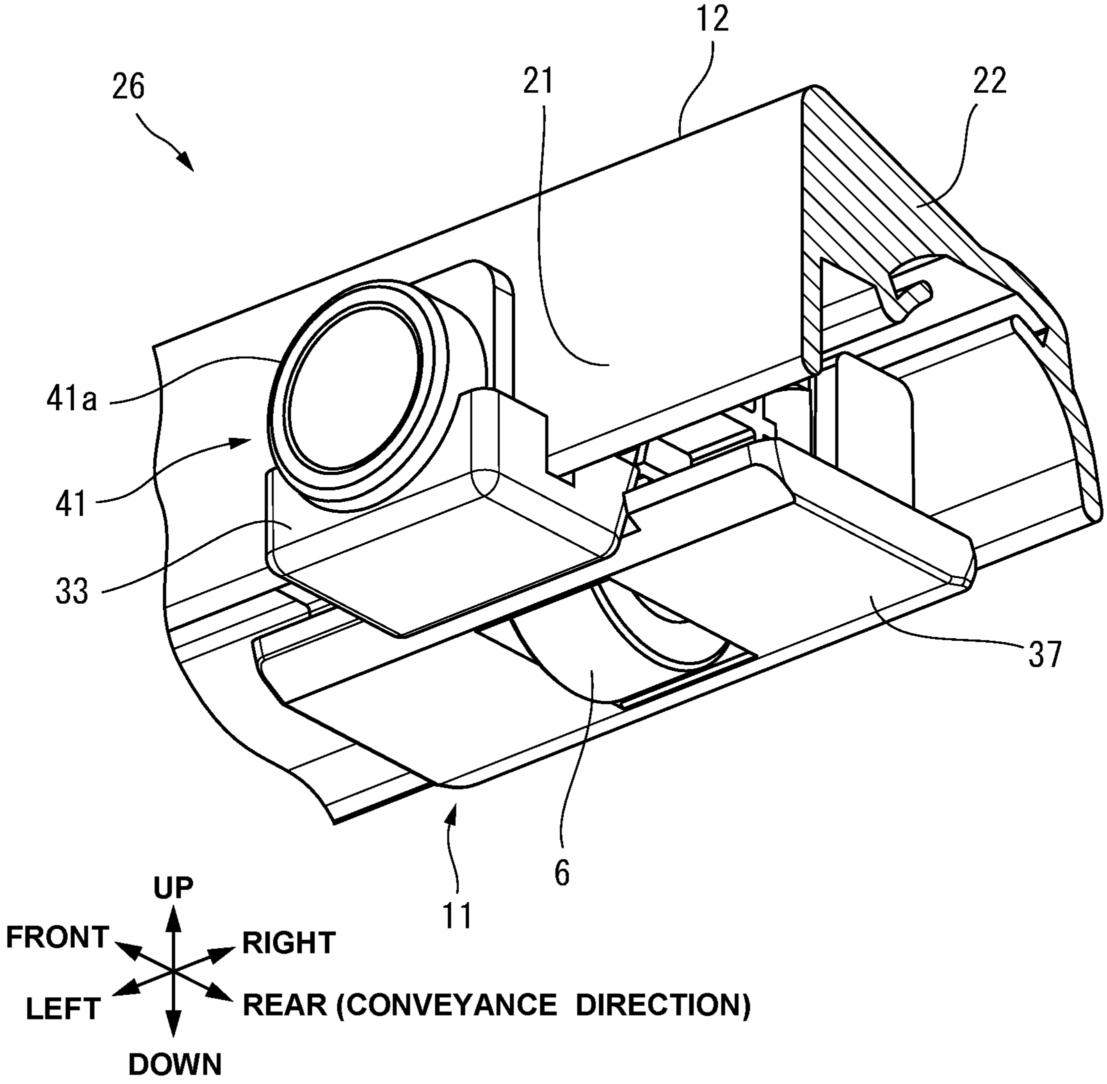
FIG. 3 is a perspective view of the pinch roller mechanism viewed obliquely from the lower front side.

As shown in FIG. 3, the pinch roller 6 is included in a pinch roller unit 11 to be described later, and supported by a rail 12. As shown in FIG. 1, the rail 12 is arranged above in the vicinity of the work stage 3 and, more exactly, above the medium driving roller 5 while being apart from the medium driving roller 5. The rail 12 extends in the left-and-right direction so as to reach from the left end portion of the work stage 3 to the right end portion. Both end portions of the rail 12 are supported by the frame 13 of the cutting plotter 1, as shown in FIG. 4.

Figure 4:
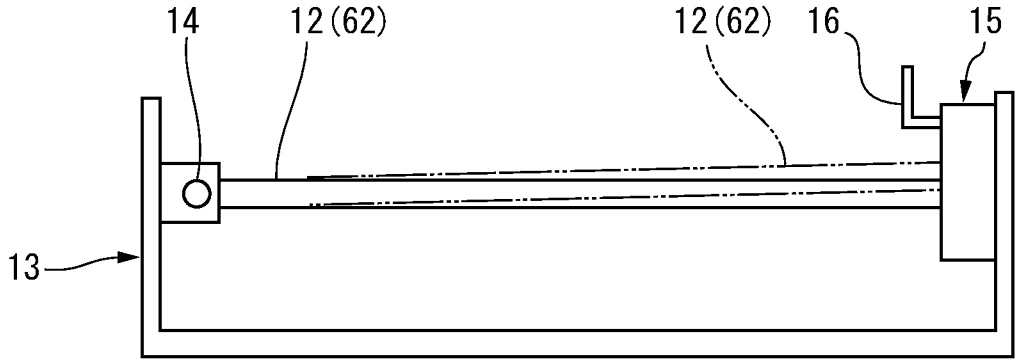
FIG. 4 is a schematic view for explaining a structure for supporting a rail.

One end portion of the rail 12 in the longitudinal direction, that is, one end portion located on the left side in FIG. 4 is swingably supported by the frame 13 via a support shaft 14. The support shaft 14 extends in parallel to the conveyance direction of the medium 2. The other end portion of the rail 12 in the longitudinal direction is supported by the frame 13 via a lifting mechanism 15. Although not illustrated in detail, the lifting mechanism 15 includes a lever 16 that a user (not shown) can operate. The rail 12 is configured to move between a use position indicated by solid lines in FIG. 4 and a tilting position indicated by alternate long and two short dashed lines when the user operates the lever 16.

When the rail 12 is located at the use position, the rail 12 becomes parallel to the work stage 3 (and the medium driving roller 5), and the medium 2 is sandwiched between the medium driving roller 5 and the pinch roller 6. When the rail 12 is located at the tilting position, the interval between the rail 12 and the work stage 3 (and the medium driving roller 5) increases, and the medium 2 can be passed between the medium driving roller 5 and the pinch roller 6.

(Rail)

Figure 5:
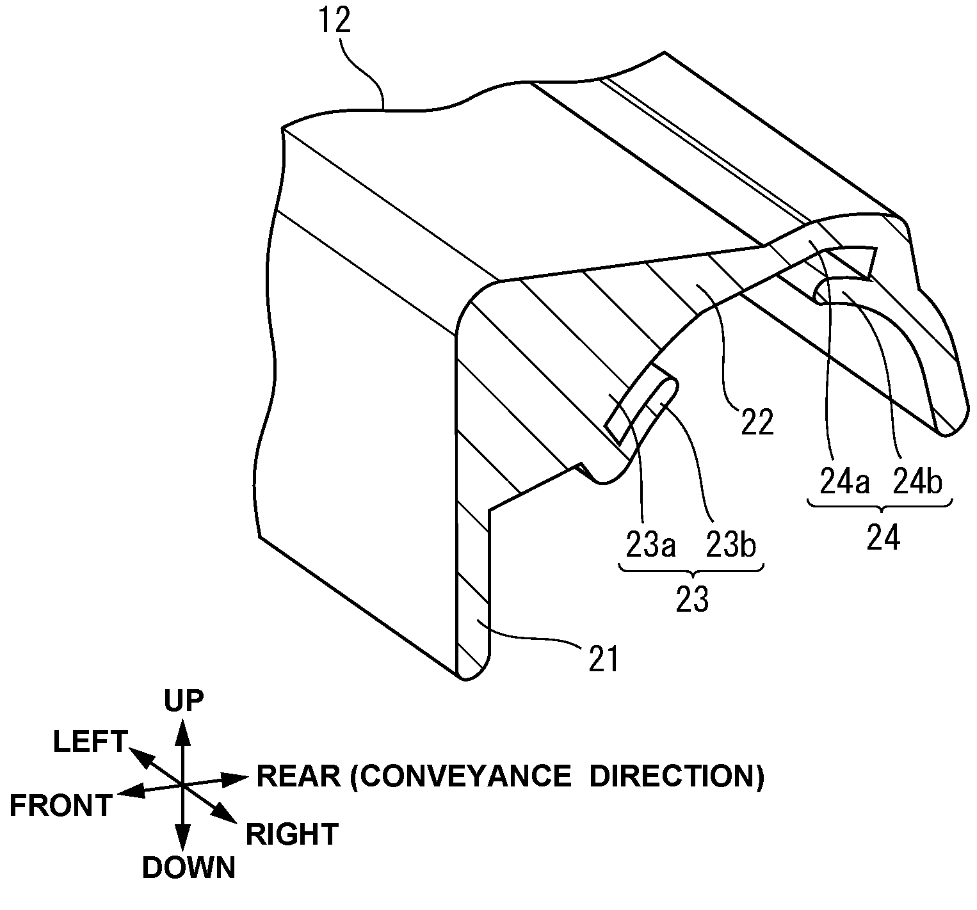
FIG. 5 is a partially cutaway perspective view of the rail.

The rail 12 can be formed by, for example, a drawn material having a predetermined sectional shape. The rail 12 according to this embodiment includes a rail main body 22 and a side wall 21, as shown in FIG. 5. The side wall 21 extends from an end of the rail main body 22 on the upstream side (the lower left side in FIG. 5) in the conveyance direction to the medium driving roller 5. In other words, the side wall 21 is a vertical portion extending in the up-and-down direction on the upstream side of the conveyance direction of the medium 2, and the rail main body 22 is a horizontal portion extending from the upper end of the vertical portion to the downstream side of the conveyance direction of the medium 2. The rail main body 22 and the side wall 21 are integrally formed and extend in a series from one end to the other end of the rail 12 without a break.

The rail main body 22 includes a front-side double wall portion 23 on the front side (on the upstream side of the conveyance direction of the medium 2), and a rear-side double wall portion 24 on the rear side. The front-side double wall portion 23 is formed by an upper wall (first wall) 23*a* and a lower wall (second wall) 23*b*, and the rear-side double wall portion 24 is formed by an upper wall (first wall) 24*a* and a lower wall (second wall) 24*b*. The upper walls 23*a* and 24*a* form the upper surface of the rail 12. The lower walls 23*b* and 24*b* are arranged adjacent to the upper walls 23*a* and 24*a* in the up-and-down direction while being apart from the upper walls 23*a* and 24*a* to the lower side (the side of the medium driving roller 5 with respect to the upper walls 23*a* and 24*a*). The upper walls 23*a* and 24*a* extend in the left-and-right direction, and the lower walls 23*b* and 24*b* also extend in the left-and-right direction along the upper walls 23*a* and 24*a*. The lower wall 23*b* of the front-side double wall portion 23 is connected to the end portion of the upper wall 23*a* on the front side and supported by the upper wall 23*a*. The lower wall 24*b* of the rear-side double wall portion 24 is connected to the end portion of the upper wall 24*a* on the rear side and supported by the upper wall 24*a*.

Figure 9:
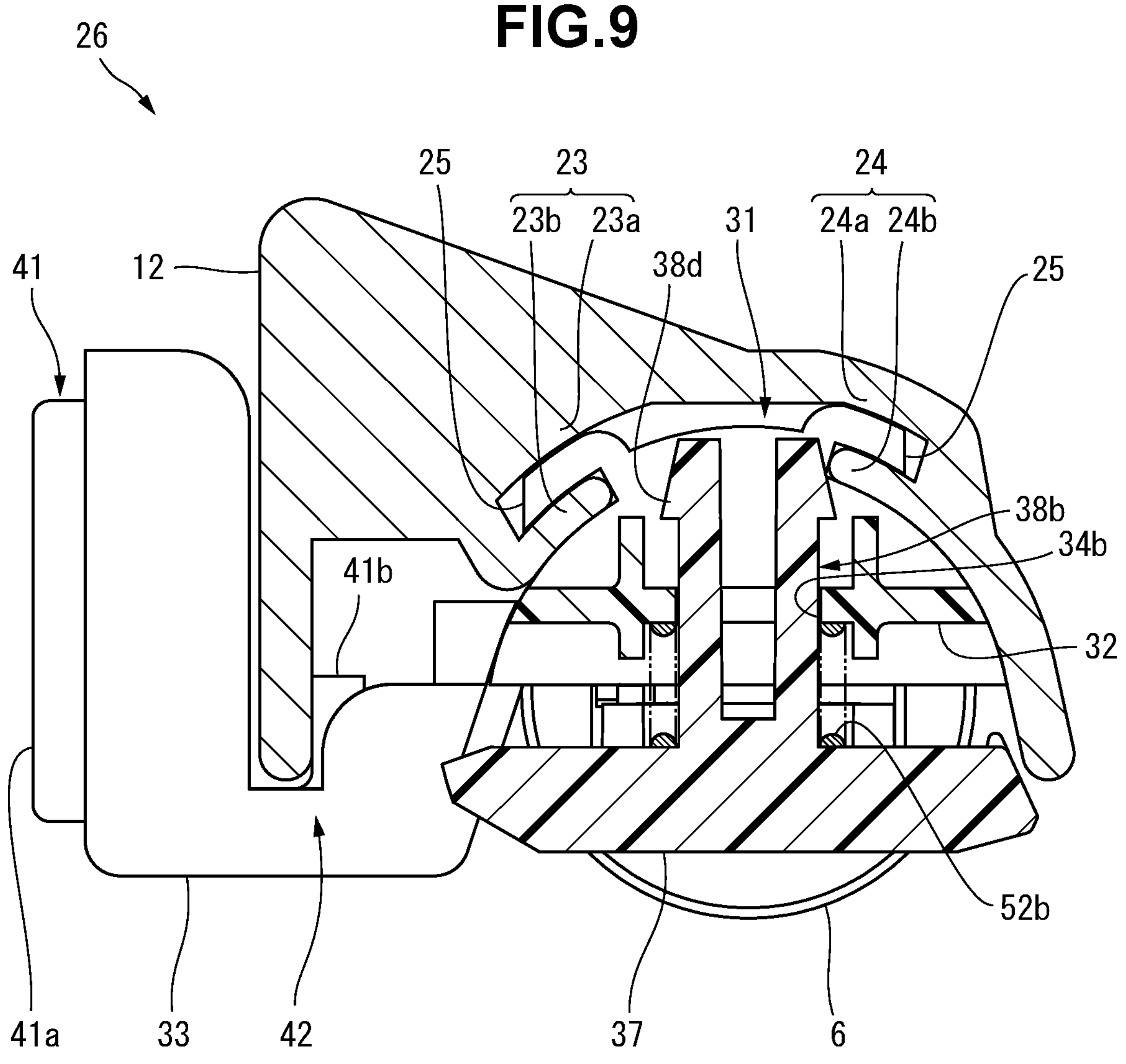
FIG. 9 is a sectional view of the pinch roller unit and the rail.

The lower surfaces of the upper walls 23*a* and 24*a* and the lower walls 23*b* and 24*b* are formed into a shape that is a part of a convex curved surface projecting upward in a state in which the rail 12 is viewed in the longitudinal direction from one end of the rail 12. Sliding pieces 25 of the pinch roller unit 11 to be described later are inserted into the gaps between the upper walls 23*a* and 24*a* and the lower walls 23*b* and 24*b*, as shown in FIG. 9.

In the side wall 21, as shown in FIG. 1, engaging holes 43 are formed at a plurality of positions of the rail 12 in the longitudinal direction. That is, the plurality of engaging holes 43 are formed side by side in the left-and-right direction. The position of each engaging hole 43 is decided based on, for example, a regular size of the medium 2 such as the A size or B size. For example, the engaging holes 43 are provided such that the pinch roller 6 passes through a margin portion in the left-and-right direction of the medium 2 having a regular size. A projection 44 (see FIG. 8) of a button 41 to be described later engages with the engaging holes 43.

(Pinch Roller Unit)

Figure 6:
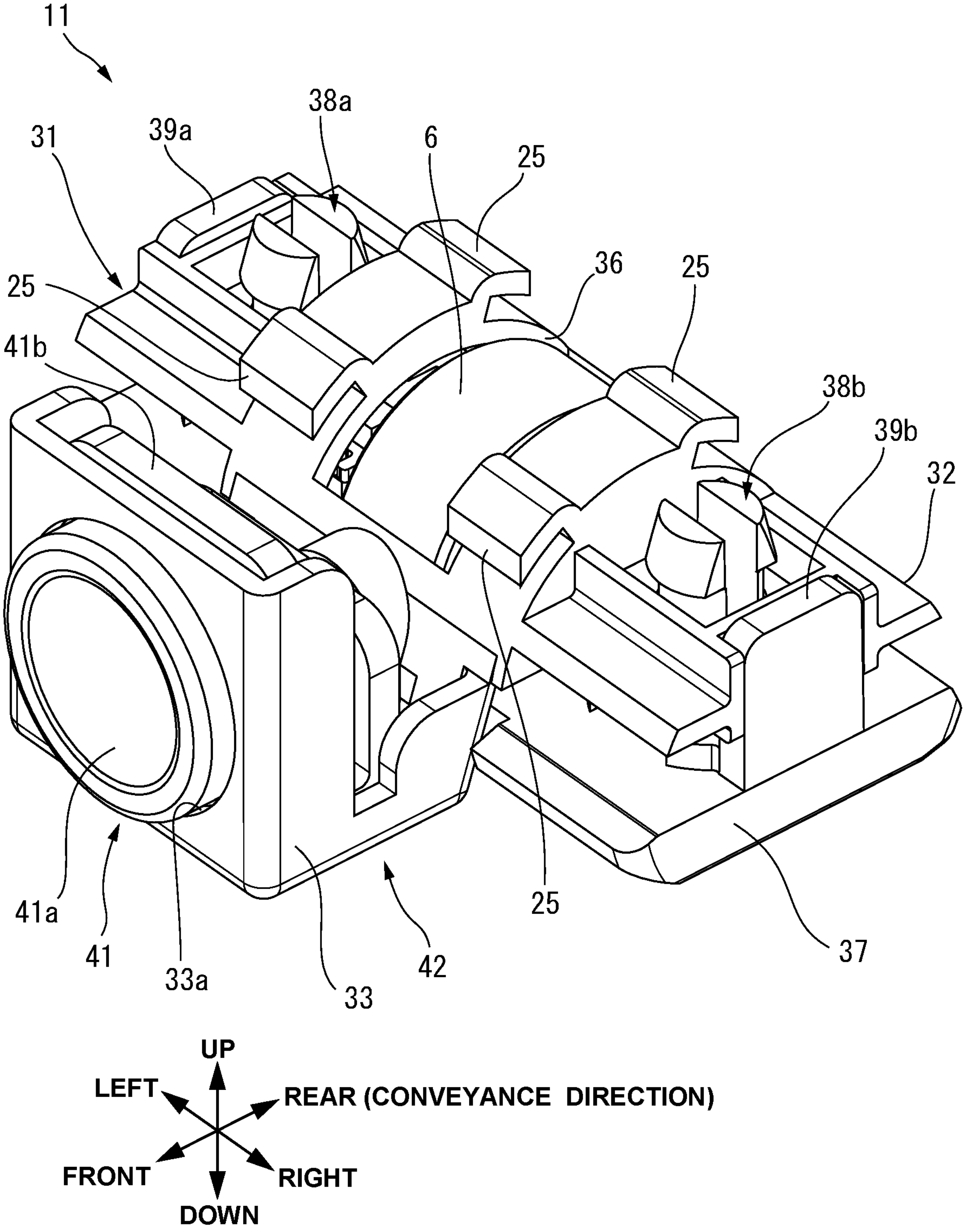
FIG. 6 is a perspective view of a pinch roller unit.

The pinch roller unit 11 forms a pinch roller mechanism 26 (see FIG. 3) together with the rail 12. The pinch roller mechanism 26 biases the pinch roller 6 toward the medium 2. The pinch roller unit 11 is formed by combining a plurality of components including the pinch roller 6. As shown in FIGS. 3 and 6, the pinch roller unit 11 includes a slider 31 including the sliding pieces 25 inserted between the upper walls 23*a* and 24*a* and the lower walls 23*b* and 24*b* of the rail 12. In this embodiment, one pinch roller unit 11 will be described. However, the cutting plotter 1 can be provided with a plurality of pinch roller units 11.

(Slider)

Figure 7:
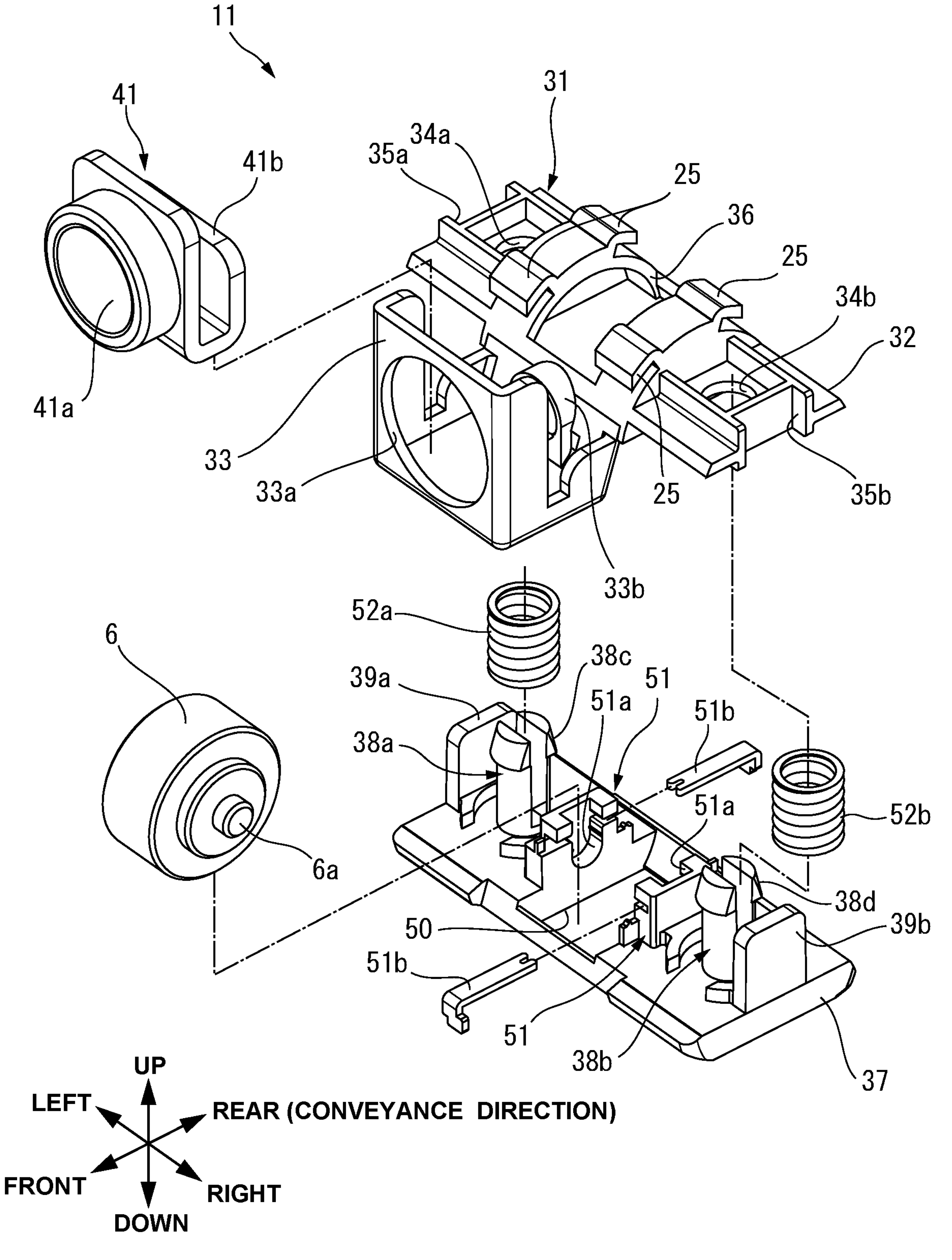
FIG. 7 is an exploded perspective view of the pinch roller unit.

As shown in FIG. 7, the slider 31 includes a slider main body 32 with the four sliding pieces 25 projecting from the upper end portion, and a button case 33 projecting from the slider main body 32 to the upstream side of the conveyance direction of the medium 2. The four sliding pieces 25 are configured to be placed on the lower walls 23*b* and 24*b* of the rail 12 and slidably move on the lower walls 23*b* and 24*b*. Hence, the slider 31 is supported by the rail 12 to be movable in the horizontal direction (left-and-right direction) along the rail 12 via the four sliding pieces 25.

Through holes 34*a* and 34*b* and guide grooves 35*a* and 35*b* are formed at both end portions of the slider main body 32 in the left-and-right direction, and a hole 36 having rectangular hole 36 is formed at the center in the left-and-right direction. The opening shape of the through holes 34*a* and 34*b* is circular when viewed from the upper side. The guide grooves 35*a* and 35*b* are formed to extend in the up-and-down direction. As shown in FIG. 6, spring guide shafts 38*a* and 38*b* of a roller bracket 37 to be described later are inserted into the through holes 34*a* and 34*b*. Slide plates 39*a* and 39*b* of the roller bracket 37 to be described later are inserted into the guide grooves 35*a* and 35*b*. The upper portion of the pinch roller 6 is inserted into the rectangular hole 36, as shown in FIG. 6.

(Lock Mechanism)

The button case 33 holds the button 41 such that it can move in a direction parallel to the conveyance direction of the medium 2. The button 41 functions as an operation element used to perform an operation of switching between an engaging state and a non-engaging state (to be described later) of the slider 31. A round hole 33*a* is formed at the front end portion of the button case 33, as shown in FIG. 7.

As shown in FIG. 7, the button 41 includes a columnar operation portion 41*a*, a spring receiving plate 41*b* located on the rear side of the operation portion 41*a*, and the projection 44. The operation portion 41*a* passes through the round hole 33*a* of the button case 33 and projects to the front side of the button case 33. Hence, the button 41 is exposed at an end portion of a lock mechanism 42 (to be described later) on the front side (an end portion on the upstream side of the conveyance direction of the medium 2). In other words, the button 41 is exposed to the outside on the upstream side of the conveyance direction with respect to the rail 12.

Figure 8:
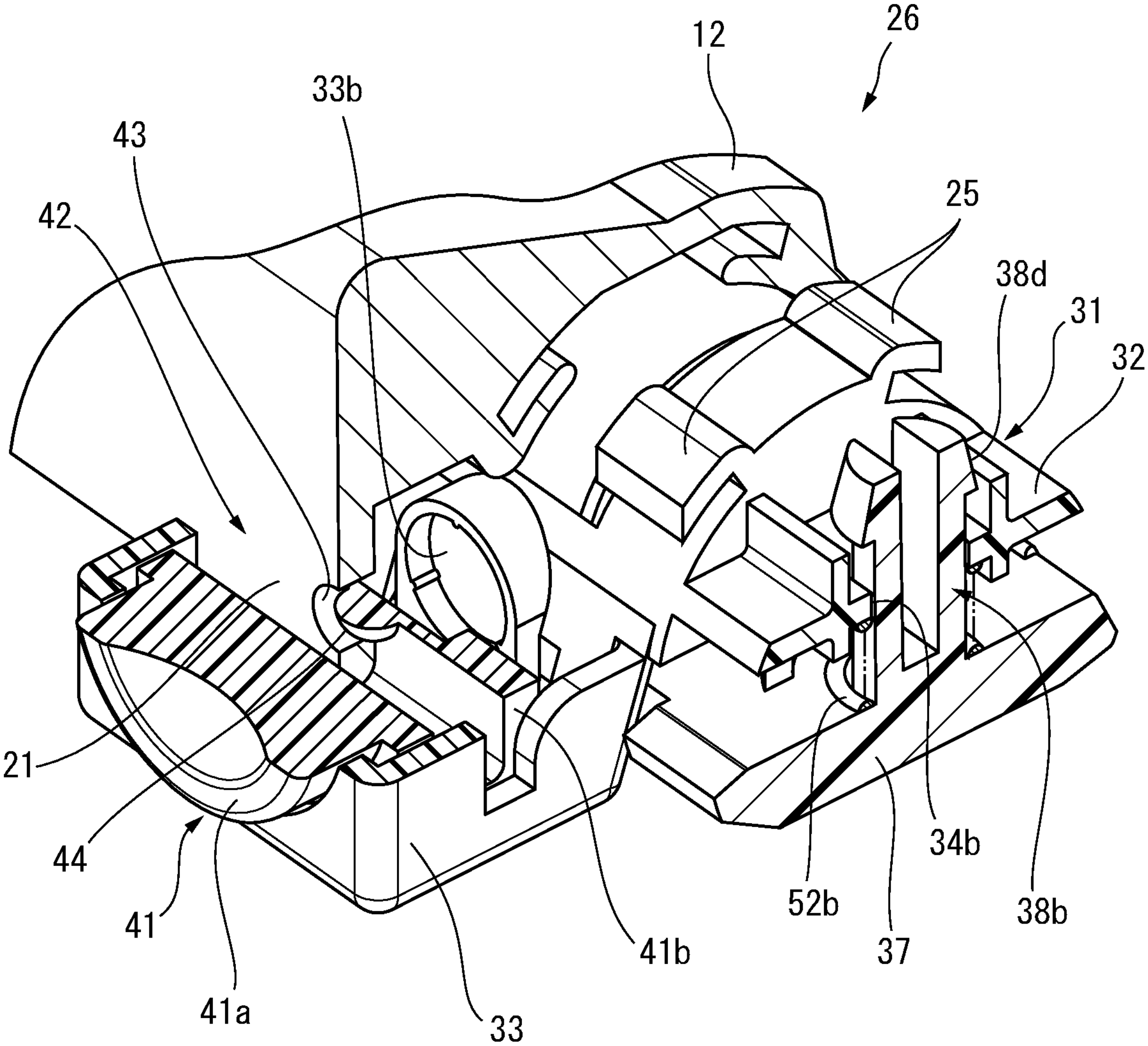
FIG. 8 is a partially cutaway perspective view of the main part of the pinch roller unit and the rail.

The spring receiving plate 41*b* has a U shape, and includes a first end portion connected to the rear surface of the operation portion 41*a*, and a second end portion inserted to the rear side of the side wall 21 of the rail 12, that is, to the inner side of the rail 12. As shown in FIG. 8, the projection 44 having a semispherical shape and projecting to the front side is formed at the second end portion of the spring receiving plate 41*b*. The projection 44 is inserted from the rear side into each of the plurality of engaging holes 43 provided in the side wall 21 of the rail 12 and engages with each of the plurality of engaging holes 43. The operation portion 41*a* and the projection 44 are connected by the spring receiving plate 41*b*.

A compression coil spring in a compressed state is inserted between the second end portion of the spring receiving plate 41*b* and a rear wall 33*b* of the button case 33 located on the rear side of the second end portion of the spring receiving plate 41*b*. For this reason, the second end portion of the spring receiving plate 41*b* is pressed in the direction of the operation portion 41*a* by the spring force of the compression coil spring. Since the second end portion of the spring receiving plate 41*b* is inserted to the rear side of the side wall 21 of the rail 12, the second end portion of the spring receiving plate 41*b* is biased toward the side wall 21 by the spring force of the compression coil spring, and the projection 44 is pressed against the side wall 21 from the rear side in a state in which the projection 44 is in contact with the side wall 21.

The lock mechanism 42 that engages the slider 31 with the rail 12 is formed by the button 41 including the projection 44 and the plurality of engaging holes 43 formed in the side wall 21 of the rail 12. In an engaging state in which the projection 44 engages with the engaging hole 43 of the side wall 21, the movement of the slider 31 with respect to the rail 12 is stopped. When the user presses the button 41 to the rear side, the spring receiving plate 41*b* separates from the side wall 21 to the rear side against the spring force of the compression coil spring, the projection 44 is removed from the engaging hole 43, and the engaging state between the engaging hole 43 and the projection 44 is canceled. In the non-engaging state, stoppage of the movement of the slider 31 with respect to the rail 12 is canceled, and the installation position of the pinch roller unit 11 can be changed by moving the slider 31 with respect to the rail 12 in the left-and-right direction. Hence, the lock mechanism 42 can switch between the engaging state in which the slider 31 engages with the rail 12 and movement of the slider 31 is stopped, and the non-engaging state in which the stoppage of the movement is canceled.

(Roller Bracket and Pinch Roller)

As shown in FIG. 7, a rectangular opening 50 is formed at the center of the roller bracket 37 in the left-and-right direction. The lower portion of the pinch roller 6 is inserted into the opening 50. Bearings 51 that rotatably support the pinch roller 6 are provided on both sides of the opening 50. The pinch roller 6 has a rotating shaft 6*a* in the axis portion and is rotatably supported by the roller bracket 37 while setting the axial direction in the left-and-right direction (horizontal direction). The bearings 51 employ a configuration for supporting both end portions of the rotating shaft 6*a*, and each bearing 51 includes a groove 51*a* having a U-shaped section that opens upward, and a cover 51*b* detachably attached to a position crossing the groove 51*a*. The groove 51*a* is formed into a shape in which the rotating shaft 6*a* of the pinch roller 6 is rotatably fitted. When the pinch roller 6 is supported by the bearings 51, the movement of the pinch roller 6 with respect to the roller bracket 37 in the up-and-down direction, the left-and-right direction, and the front-and-rear direction is prevented.

At both end portions of the roller bracket 37 in the left-and-right direction, the spring guide shafts 38*a* and 38*b* and the slide plates 39*a* and 39*b* stand toward the slider 31 on the upper side. As shown in FIGS. 7 to 9, the spring guide shafts 38*a* and 38*b* are inserted into the through holes 34*a* and 34*b* of the slider main body 32 while being inserted into pressing springs 52*a* and 52*b* each formed by a compression coil spring. The inner diameter of the through holes 34*a* and 34*b* is larger than the outer diameter of the spring guide shafts 38*a* and 38*b* and smaller than the outer diameter of the pressing springs 52*a* and 52*b*. For this reason, the pressing springs 52*a* and 52*b* are held between the slider main body 32 and the roller bracket 37 in a compressed state.

Slip-off preventing pawl pieces 38*c* and 38*d* are provided at the distal end portions of the spring guide shafts 38*a* and 38*b*, respectively. The outer diameter of the pawl pieces 38*c* and 38*d* is larger than the inner diameter of the through holes 34*a* and 34*b*. For this reason, even if the rail 12 is located at the tilting position shown in FIG. 4, the spring guide shafts 38*a* and 38*b* never slip off from the through holes 34*a* and 34*b* to make the roller bracket 37 fall.

The slide plates 39*a* and 39*b* are fitted in the guide grooves 35*a* and 35*b* of the slider main body 32 to be movable in the up-and-down direction. Hence, the roller bracket 37 is supported by the slider 31 to be movable forward and backward with respect to the medium driving roller 5.

(Operation and Effect)

In the thus configured pinch roller mechanism 26, when the rail 12 is located at the tilting position indicted by the alternate long and two short dashed lines in FIG. 4, the pinch roller 6 separates upward from the medium driving roller 5. In this state, the roller bracket 37 is moved downward with respect to the slider 31 by the spring force of the pressing springs 52*a* and 52*b*, and pawl pieces 38*c* and 38*d* of the spring guide shafts 38*a* and 38*b* contact the slider main body 32.

Then, when the rail 12 is located at the use position indicated by the solid lines in FIG. 4 in a state in which the medium 2 is placed on the work stage 3, the pinch roller 6 presses the medium 2 against the medium driving roller 5. At this time, the roller bracket 37 moves toward the slider main body 32 against the spring force of the pressing springs 52*a* and 52*b*, and the spring force of the pressing springs 52*a* and 52*b* is applied to the pinch roller 6 via the roller bracket 37. In this pressing state, the reaction force of the spring force is transmitted from the slider 31 to the rail 12 and received by the rail 12. Hence, the pinch roller mechanism 26 presses the medium 2 against the rail 12.

The pressing springs 52*a* and 52*b*, the roller bracket 37, and the pinch roller 6 can move with respect to the rail 12 together with the slider 31. Hence, according to this embodiment, it is possible to provide the pinch roller mechanism 26 that causes the pinch roller 6 to press the medium 2 by a predetermined pressing force regardless of the position of the pinch roller 6 in the left-and-right direction of the cutting plotter 1, which is the longitudinal direction of the rail 12.

To change the position of the pinch roller 6 in the left-and-right direction, first, the rail 12 is moved to the tilting position, and in this state, the button 41 of the pinch roller unit 11 is pressed to the rear side. By this pressing operation, the engaging state between the projection 44 and the engaging hole 43 of the side wall 21 is canceled. In the state in which the button 41 is pressed, the slider 31 is moved in the left-and-right direction along the rail 12. Pressing of the button 41 is stopped at a desired position, and the slider 31 is further moved in the left-and-right direction. This moving operation is performed until the projection 44 engages with the engaging hole 43 of the side wall 21 near a desired position. When the projection 44 thus engages with the engaging hole 43, the moving operation of the pinch roller 6 is ended.

In this embodiment, the lock mechanism 42 is provided. The lock mechanism 42 is capable of switching between the engaging state in which the slider 31 engages with the rail 12 and movement of the slider 31 is stopped, and the non-engaging state in which the stoppage of the movement is canceled. The lock mechanism 42 is configured to switch between the engaging state and the non-engaging state by operating the button 41 exposed at the end portion on the upstream side of the conveyance direction of the medium 2. Hence, the operation of changing the position of the pinch roller 6 in the left-and-right direction can easily be performed from the front side of the cutting plotter 1.

When the projection 44 of the button 41 engages with the engaging hole 43, the movement of the slider 31 is stopped. The position of the engaging hole 43 of the rail 12 is decided based on the regular size of the medium 2. It is therefore possible to correctly and easily perform positioning of the pinch roller 6 with respect to the medium 2 with the regular size.

The rail 12 according to this embodiment includes the side wall 21 extending in the up-and-down direction, and the rail main body 22 extending from the upper end of the side wall 21 to the downstream side of the conveyance direction of the medium 2. The rail main body 22 includes the front-side double wall portion 23 and the rear-side double wall portion 24. The slider 31 is movably supported by the lower wall 23*b* of the front-side double wall portion 23 and the lower wall 24*b* of the rear-side double wall portion 24. Since the front-side double wall portion 23 and the rear-side double wall portion 24 function as a substantial reinforcing portion of the rail 12, the rigidity of the rail 12 can be increased. For this reason, the reaction force of the spring force applied to the pinch roller 6 can reliably be received by the rail 12. Hence, even if a plurality of pinch rollers 6 are attached to uneven positions in the left-and-right direction, it is possible to prevent a difference generated in the pressing force applied to the pinch rollers 6.

Second Embodiment

Figure 10:
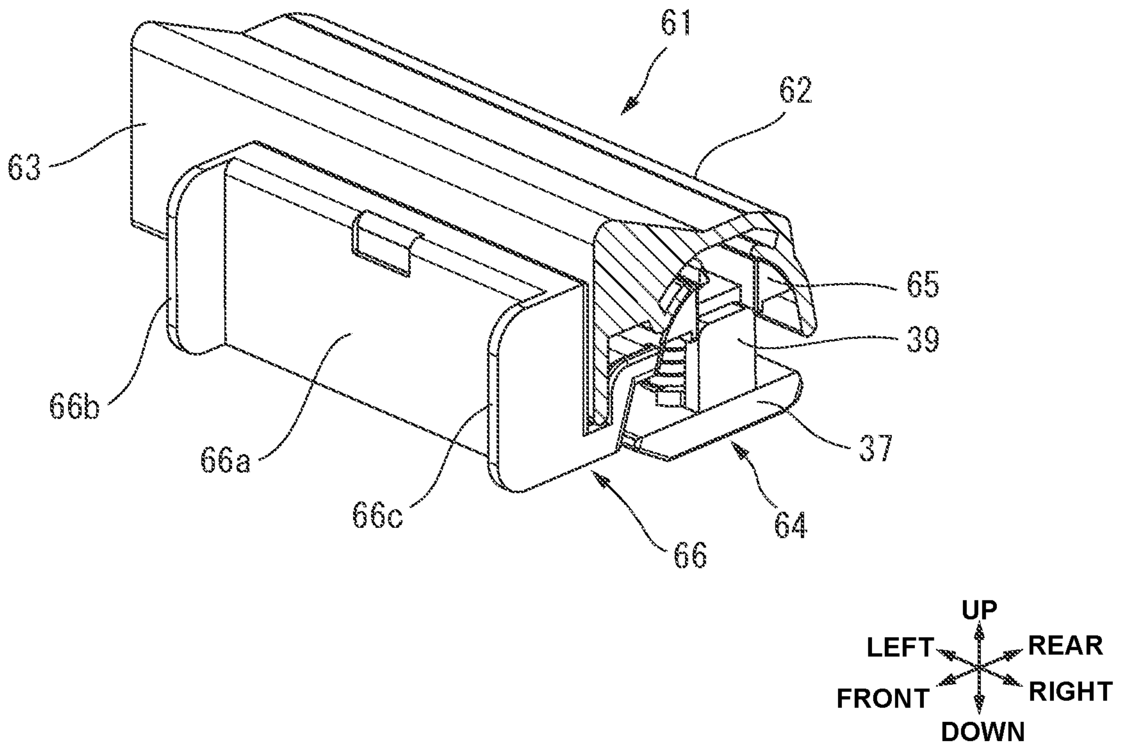
FIG. 10 is a perspective view of a pinch roller mechanism according to the second embodiment of the present invention.
Figure 11:
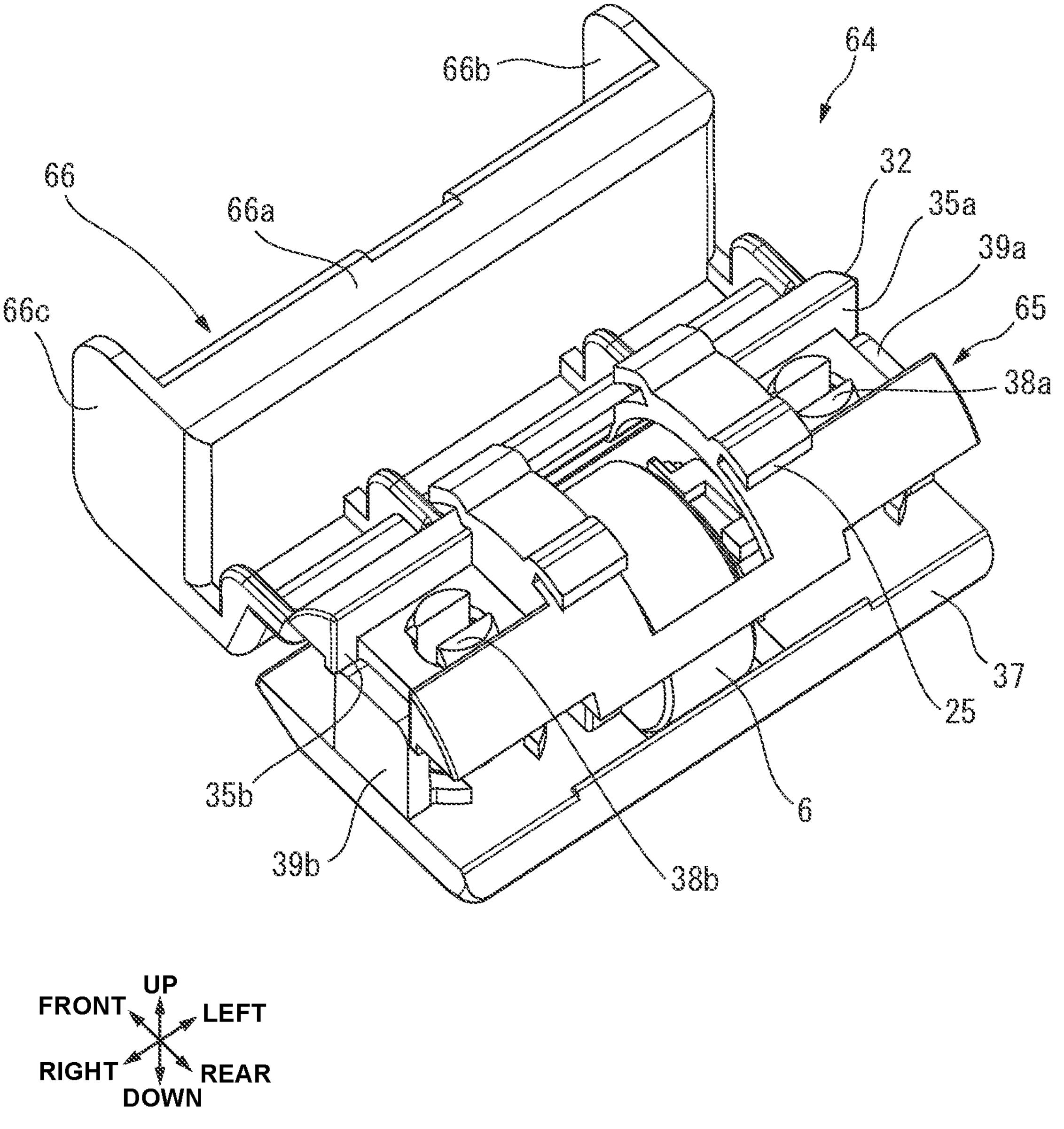
FIG. 11 is a perspective view of a pinch roller unit according to the second embodiment.
Figure 12:
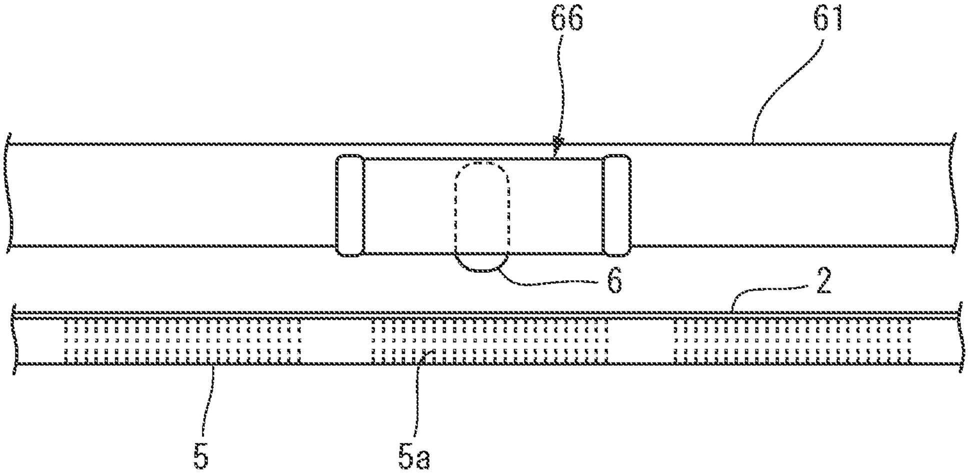
FIG. 12 is a front view of a driving roller.

A pinch roller mechanism according to the second embodiment of the present invention is shown in FIGS. 10 to 12. The same reference numerals as those of the members shown in FIGS. 1 to 9 denote the same or similar members in FIGS. 10 to 12, and a detailed description thereof will appropriately be omitted.

A pinch roller mechanism 61 shown in FIG. 10 is different from the pinch roller mechanism 26 according to the first embodiment in that the pinch roller mechanism does not include the lock mechanism 42 and includes an operation piece 66 in place of the button case 33. The pinch roller mechanism 61 is formed by a rail 62 and a pinch roller unit 64. The structure of the rail 62 is the same as the structure of the rail 12 according to the first embodiment except that the engaging holes 43 are not formed in a side wall 63.

A slider 65 of the pinch roller unit 64 includes a slider main body 32 that is the same as in the first embodiment, and the operation piece 66 in place of the button case 33 according to the first embodiment. The operation piece 66 is a piece that a user picks with fingers and operates, and is exposed to the outside near the rail 62. As shown in FIG. 11, the operation piece 66 is formed at the front end portion of the slider main body 32 integrally with the slider main body 32, and is located on the front side of the side wall 63 of the rail 62, as shown in FIG. 10. The operation piece 66 includes a front surface plate 66*a* extending in the left-and-right direction on the front side of the rail 62, and a pair of left and right side plates 66*b* and 66*c* extending frontward from both ends of the front surface plate 66*a* in the left-and-right direction.

When the operation piece 66 is moved in the left-and-right direction in a state in which the rail 62 is located at the tilting position indicated by the alternate long and two short dashed lines in FIG. 4, the pinch roller unit 64 slides along the rail 62 in the left-and-right direction. Hence, the pinch roller unit 64 can be arranged at an arbitrary position in the left-and-right direction.

According to the thus configured pinch roller mechanism 61, even if the size of a medium 2 is not a regular size, it is possible to arrange the pinch roller unit 64 at a position suitable for the medium 2 and correctly press the medium 2 by a pinch roller 6.

As shown in FIG. 12, a number (a plurality of) small projections 5*a* are formed in a predetermined range of the peripheral surface of a medium driving roller 5. When the medium 2 passes on the medium driving roller 5, the projections 5*a* bite into the medium 2. For this reason, the medium 2 only moves in the conveyance direction along with the rotation of the medium driving roller 5 and does not move in the left-and-right direction. Since the pinch roller 6 only presses the medium 2, the pinch roller unit 64 never shifts in the left-and-right direction during the operation even if the lock mechanism 42 is absent.

Note that in the first and second embodiments, an example in which the present invention is applied to the cutting plotter 1 has been described. However, the present invention can also be applied to another plotter. In the other plotter, the pen carriage 4 supports a pen that performs predetermined processing for the medium 2. For example, the present invention can be applied to a pen plotter including the pen carriage 4 that supports a pen configured to draw a character or a pattern on the sheet-shaped medium 2.

Other Embodiments

The present applicant recognizes following inventions as well.

A pinch roller mechanism of a plotter according to the first aspect of the present invention comprises a rail supported by a frame of the plotter and extending in a first direction crossing a conveyance direction of a medium while being apart from a medium driving roller configured to convey the medium, a slider supported by the rail to be movable along the rail, a roller bracket supported by the slider to be movable forward and backward with respect to the medium driving roller, a spring provided between the slider and the roller bracket and configured to bias the roller bracket toward the medium driving roller and a pinch roller rotatably supported by the roller bracket while setting an axial direction in the first direction. The medium driving roller preferably includes a plurality of projections formed on the peripheral surface.

As the pinch roller mechanism according to the second aspect of the present invention, in the first aspect, the slider includes an operation piece exposed to an outside of the rail.

As the pinch roller mechanism according to the third aspect of the present invention, in the first aspect, the pinch roller mechanism further comprises a lock mechanism configured to switch between an engaging state in which the slider engages with the rail and movement of the slider is stopped, and a non-engaging state in which the stoppage of the movement is canceled, wherein the lock mechanism includes an operation element exposed on an upstream side of the conveyance direction with respect to the rail and configured to perform an operation of switching between the engaging state and the non-engaging state.

As the pinch roller mechanism according to the fourth aspect of the present invention, in any one of the first to third aspects, the rail includes a rail main body, and a side wall extending from an end of the rail main body on the upstream side of the conveyance direction to the medium driving roller, the rail main body includes a first wall extending in the first direction, and a second wall provided on a side of the medium driving roller with respect to the first wall, extending in the first direction along the first wall, and supported by the first wall, and the slider is movably supported by the second wall.

As the pinch roller mechanism according to the fifth aspect of the present invention, in the fourth aspect, the slider includes a sliding piece inserted into a gap between the first wall and the second wall of the rail.

As the pinch roller mechanism according to the sixth aspect of the present invention, in the first aspect, the pinch roller mechanism further comprises a lock mechanism configured to engage the slider with the rail, wherein the lock mechanism includes a plurality of engaging holes formed in the rail side by side in the first direction, and a projection held by the slider and inserted into each of the plurality of engaging holes. The positions of the plurality of engaging holes are preferably decided based on the regular size of the medium.

As the pinch roller mechanism according to the seventh aspect of the present invention, in the sixth aspect, the lock mechanism further includes an operation portion exposed to an outside of the rail, and a plate configured to connect the operation portion and the projection, and when the operation portion is pressed, remove the projection from each of the plurality of engaging holes and make the slider movable with respect to the rail.

As the pinch roller mechanism according to the eighth aspect of the present invention, in the seventh aspect, the plate includes a first end portion connected to the operation portion, and a second end portion which is inserted to an inner side of the rail and on which the projection is formed, and the second end portion is pressed in a direction of the operation portion. A spring configured to press the second end portion in the direction of the operation portion may be arranged between the second end portion of the plate and the slider.

As the pinch roller mechanism according to the ninth aspect of the present invention, in any one of the first to eighth aspects, the roller bracket includes a spring guide shaft standing toward the slider and configured to be inserted into the spring, and the slider includes a through hole into which the spring guide shaft is inserted.

As the pinch roller mechanism according to the 10th aspect of the present invention, in the ninth aspect, an inner diameter of the through hole is larger than an outer diameter of the spring guide shaft and smaller than an outer diameter of the spring.

As the pinch roller mechanism according to the 11th aspect of the present invention, in the 10th aspect, a distal end of the spring guide shaft includes a pawl piece having an outer diameter larger than the inner diameter of the through hole.

As the pinch roller mechanism according to the 12th aspect of the present invention, in the any one of the first to 11th aspects, the roller bracket includes a slide plate standing toward the slider, and the slider includes a guide groove into which the slide plate is inserted.

As the pinch roller mechanism according to the 13th aspect of the present invention, in the 12th aspect, the slide plate includes a first slide plate and a second slide plate, which are provided at both ends of the roller bracket, and the guide groove includes a first guide groove and a second guide groove, which are formed at both ends of the slider. Both ends of the roller bracket and both ends of the slider are preferably both ends in the first direction.

As the pinch roller mechanism according to the 14th aspect of the present invention, in any one of the first to 13th aspects, the roller bracket includes an opening into which the pinch roller is inserted, and a bearing configured to support a rotating shaft of the pinch roller inserted into the opening.

A plotter according to the 15th aspect of the present invention comprises a medium driving roller configured to convey a medium, a work stage arranged on an upstream side of a conveyance direction of the medium with respect to the medium driving roller, a frame standing on both sides of the work stage, a pinch roller mechanism configured to bias a pinch roller toward the medium, and a pen carriage configured to support a pen that performs processing for the medium, wherein the pinch roller mechanism comprises a pinch roller mechanism according to any one of the first to 14th aspects. The medium driving roller preferably includes a plurality of projections formed on the peripheral surface.

What is claimed is:

1. A pinch roller mechanism of a plotter, comprising:

a rail supported by a frame of the plotter and extending in a first direction crossing a conveyance direction of a medium while being apart from a medium driving roller configured to convey the medium;

a slider supported by the rail to be movable along the rail;

a roller bracket supported by the slider to be movable forward and backward with respect to the medium driving roller;

a spring provided between the slider and the roller bracket and configured to bias the roller bracket toward the medium driving roller; and a pinch roller rotatably supported by the roller bracket while setting an axial direction in the first direction;

wherein:

the roller bracket includes a slide plate standing toward the slider, the slider includes a guide groove into which the slide plate is inserted;

the slide plate includes a first slide plate and a second slide plate, which are provided at both ends of the roller bracket, and the guide groove includes a first guide groove and a second guide groove, which are formed at both ends of the slider.

2. The mechanism according to claim 1, wherein the slider includes an operation piece exposed to an outside of the rail.

3. The mechanism according to claim 1, further comprising a lock mechanism configured to switch between an engaging state in which the slider engages with the rail and movement of the slider is stopped, and a non-engaging state in which the stoppage of the movement is canceled, wherein the lock mechanism includes an operation element exposed on an upstream side of the conveyance direction with respect to the rail and configured to perform an operation of switching between the engaging state and the non-engaging state.

4. The mechanism according to claim 1, wherein the rail includes:

a rail main body; and a side wall extending from an end of the rail main body on the upstream side of the conveyance direction to the medium driving roller, the rail main body includes:

a first wall extending in the first direction; and a second wall provided on a side of the medium driving roller with respect to the first wall, extending in the first direction along the first wall, and supported by the first wall, and the slider is movably supported by the second wall.

5. The mechanism according to claim 4, wherein the slider includes a sliding piece inserted into a gap between the first wall and the second wall of the rail.

6. The mechanism according to claim 1, further comprising a lock mechanism configured to engage the slider with the rail, wherein the lock mechanism includes:

a plurality of engaging holes formed in the rail side by side in the first direction; and a projection held by the slider and inserted into each of the plurality of engaging holes.

7. The mechanism according to claim 6, wherein the lock mechanism further includes:

an operation portion exposed to an outside of the rail; and a plate configured to connect the operation portion and the projection, and when the operation portion is pressed, remove the projection from each of the plurality of engaging holes and make the slider movable with respect to the rail.

8. The mechanism according to claim 7, wherein the plate includes a first end portion connected to the operation portion, and a second end portion which is inserted to an inner side of the rail and on which the projection is formed, and the second end portion is pressed in a direction of the operation portion.

9. The mechanism according to claim 1, wherein the roller bracket includes:

an opening into which the pinch roller is inserted; and a bearing configured to support a rotating shaft of the pinch roller inserted into the opening.

10. A plotter comprising:

a medium driving roller configured to convey a medium;

a work stage arranged on an upstream side of a conveyance direction of the medium with respect to the medium driving roller;

a frame standing on both sides of the work stage;

a pinch roller mechanism configured to bias a pinch roller toward the medium; and a pen carriage configured to support a pen that performs processing for the medium, wherein the pinch roller mechanism comprises a pinch roller mechanism according to claim 1.

11. A pinch roller mechanism of a plotter comprising:

a rail supported by a frame of the plotter and extending in a first direction crossing a conveyance direction of a medium while being apart from a medium driving roller configured to convey the medium;

a slider supported by the rail to be movable along the rail;

a roller bracket supported by the slider to be movable forward and backward with respect to the medium driving roller;

a spring provided between the slider and the roller bracket and configured to bias the roller bracket toward the medium driving roller; and a pinch roller rotatably supported by the roller bracket while setting an axial direction in the first direction, wherein:

the roller bracket includes a spring guide shaft standing toward the slider and configured to be inserted into the spring, and the slider includes a through hole into which the spring guide shaft is inserted.

12. The mechanism according to claim 11, wherein an inner diameter of the through hole is larger than an outer diameter of the spring guide shaft and smaller than an outer diameter of the spring.

13. The mechanism according to claim 12, wherein a distal end of the spring guide shaft includes a pawl piece having an outer diameter larger than the inner diameter of the through hole.

* * * * *